(12) United States Patent
Settles et al.

(10) Patent No.: US 8,096,394 B2
(45) Date of Patent: Jan. 17, 2012

(54) CLUTCH BRAKE

(75) Inventors: John Alex Settles, Cuba, MO (US);
Brian Robert Ley, Washington, MO (US); James Michael Chapman, Bourbon, MO (US)

(73) Assignee: Ace Manufacturing & Parts Company, Sullivan, MO (US)

( * ) Notice: Subject to any disclaimer, the term of this patent is extended or adjusted under 35 U.S.C. 154(b) by 405 days.

(21) Appl. No.: 12/537,314

(22) Filed: Aug. 7, 2009

(65) Prior Publication Data

US 2011/0031088 A1 Feb. 10, 2011

(51) Int. Cl.
*F16D 67/02* (2006.01)
*F16D 65/12* (2006.01)

(52) U.S. Cl. ............... 192/13 R; 192/DIG. 1; 188/73.32

(58) Field of Classification Search .................. None
See application file for complete search history.

(56) References Cited

U.S. PATENT DOCUMENTS

| | | | |
|---|---|---|---|
| 1,550,279 A * | 8/1925 | Petrasek | ...................... 192/18 R |
| 4,512,450 A | 4/1985 | Babcock | |
| 5,031,739 A | 7/1991 | Flotow | |
| 5,076,406 A | 12/1991 | Gregory | |
| 5,099,970 A * | 3/1992 | Harris | ........................ 192/13 R |
| 5,285,881 A | 2/1994 | Lero | |
| 5,332,075 A | 7/1994 | Quigley | |
| 5,415,256 A * | 5/1995 | Weigand et al. | ............. 192/13 R |
| 5,435,425 A | 7/1995 | Ijames | |
| 6,450,310 B1 * | 9/2002 | Catrinta | ...................... 192/13 R |

* cited by examiner

*Primary Examiner* — Richard M. Lorence
(74) *Attorney, Agent, or Firm* — Senniger Powers LLP

(57) ABSTRACT

A clutch brake for use in association with a braking mechanism for braking rotation of a shaft connecting an engine to a transmission. The clutch brake includes first and second clutch brake sections having first and second lock plates. The first and second clutch brake sections are selectively configurable in a disconnected configuration and a connected configuration. The clutch brake further comprises a fastening mechanism on the first and second lock plates for fastening the first and second clutch brake sections in the connected configuration. The fastening mechanism includes a first fastening component on the first lock plate and a second fastening component on the second lock plate. The first fastening component further includes a fastener body movably mounted in an opening in the first lock plate, and a fastening arm extending from the fastener body. The fastener body is movable from a fastening position, to a release position.

10 Claims, 6 Drawing Sheets

CLUTCH BRAKE

FIELD OF THE INVENTION

The present invention generally relates to braking systems and more particularly to a clutch brake having a friction surface for use in association with a braking mechanism for braking rotation of a shaft connecting an engine to a transmission.

BACKGROUND OF THE INVENTION

Presently, there are clutch braking systems in vehicles, such as tractor trailer trucks (over-the-road trucks) with non-synchronized transmissions, for braking the rotation of an input shaft connecting an engine to a transmission. Generally, these systems are used when going between first gear and reverse, and include a clutch brake having a friction pad on its surface, located between the engine and the transmission and attached to the input shaft. A clutch yoke having fingers for moving a clutch plate longitudinally along the input shaft is further provided for engaging the clutch plate with the clutch brake, and linkage connects a foot pedal to the clutch yoke for moving the clutch yoke between clutch brake engaging and non-engaging positions. Typically, the clutch brake is an annular one-piece member which is initially installed before the input shaft is attached to the transmission by slipping the clutch brake over the input shaft and securing it thereto. In time, the friction pad of the clutch brake wears and the clutch brake must be replaced. A conventional method for replacing such a one-piece member clutch brake is to disconnect the transmission to reveal one end of the input shaft and slip the worn clutch brake off the input shaft and replace it with a new clutch brake. This method has proven to be a timely and costly procedure.

There are presently available clutch brakes that can be mounted on and removed from the input shaft without disconnecting the input shaft from the transmission. These clutch brakes are made in two pieces which are connected together by screw fasteners around the input shaft. However, it can be difficult and time consuming to connect and disconnect the pieces using screw fasteners.

Co-assigned U.S. Pat. No. 5,435,425 discloses a two-piece clutch brake which can be easily replaced. The brake illustrated in this patent includes a pair of locking plates having detent members for locking the clutch brake around a shaft. These detent members are prone to break at their junctures with respective locking plates. Accordingly, there is a need for an improved design.

SUMMARY OF THE INVENTION

In one embodiment, the present invention is directed to a clutch brake for use in association with a braking mechanism for braking rotation of a shaft connecting an engine to a transmission. The clutch brake is generally annular in shape and comprises first and second clutch brake sections. A friction surface on the first and second clutch brake sections is adapted to face the braking mechanism and to selectively engage the braking mechanism for braking rotation of the shaft. The first and second clutch brake sections are selectively configurable in a disconnected configuration in which the clutch brake sections are adapted to be moved apart from one another and the clutch brake removed from the shaft with the shaft passing in a radial direction with respect to the clutch brake between the first and second clutch brake sections. The clutch brake sections are also selectively configurable in a connected configuration in which the clutch brake encloses the shaft and the first and second clutch brake sections extend continuously along the circumference of the shaft and prevent the shaft from passing in a radial direction with respect to the clutch brake between the first and second clutch brake sections. In this configuration the clutch brake may be installed on and removed from the shaft without disconnecting the shaft from the transmission or the engine. The first section of the clutch brake comprises a first lock plate. The second section of the clutch brake comprises a second lock plate. The clutch brake further comprises a fastening mechanism on the first and second lock plates for fastening the first and second clutch brake sections in the connected configuration. The fastening mechanism comprises a first fastening component on the first lock plate and a second fastening component on the second lock plate. The first fastening component further comprises a fastener body movably mounted in an opening in the first lock plate, and a fastening arm extending from the fastener body. The fastener body is movable in the opening from a fastening position in which the fastening arm is in fastening engagement with the second lock plate to fasten the first and second clutch brake sections in the connected configuration, to a release position in which the fastening arm is not in fastening engagement with the second lock plate to allow the first and second clutch brake sections to be moved to the disconnected configuration.

In another embodiment, the present invention is directed to a clutch brake for use in association with a braking mechanism for braking rotation of a shaft connecting an engine to a transmission. The clutch brake is generally annular in shape and comprises first and second clutch brake sections. The first and second clutch brake sections are selectively configurable in a disconnected configuration in which the clutch brake sections are adapted to be moved apart from one another and the clutch brake removed from the shaft with the shaft passing in a radial direction with respect to the clutch brake between the first and second clutch brake sections. The clutch brake sections are also selectively configurable in a connected configuration in which the clutch brake encloses the shaft and the first and second clutch brake sections extend continuously along the circumference of the shaft and prevent the shaft from passing in a radial direction with respect to the clutch brake between the first and second clutch brake sections. In this configuration the clutch brake may be installed on and removed from the shaft without disconnecting the shaft from the transmission or the engine. The clutch brake further comprises a hinge pin connecting the first and second clutch brake sections for pivoting the sections between the connected and disconnected configurations.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
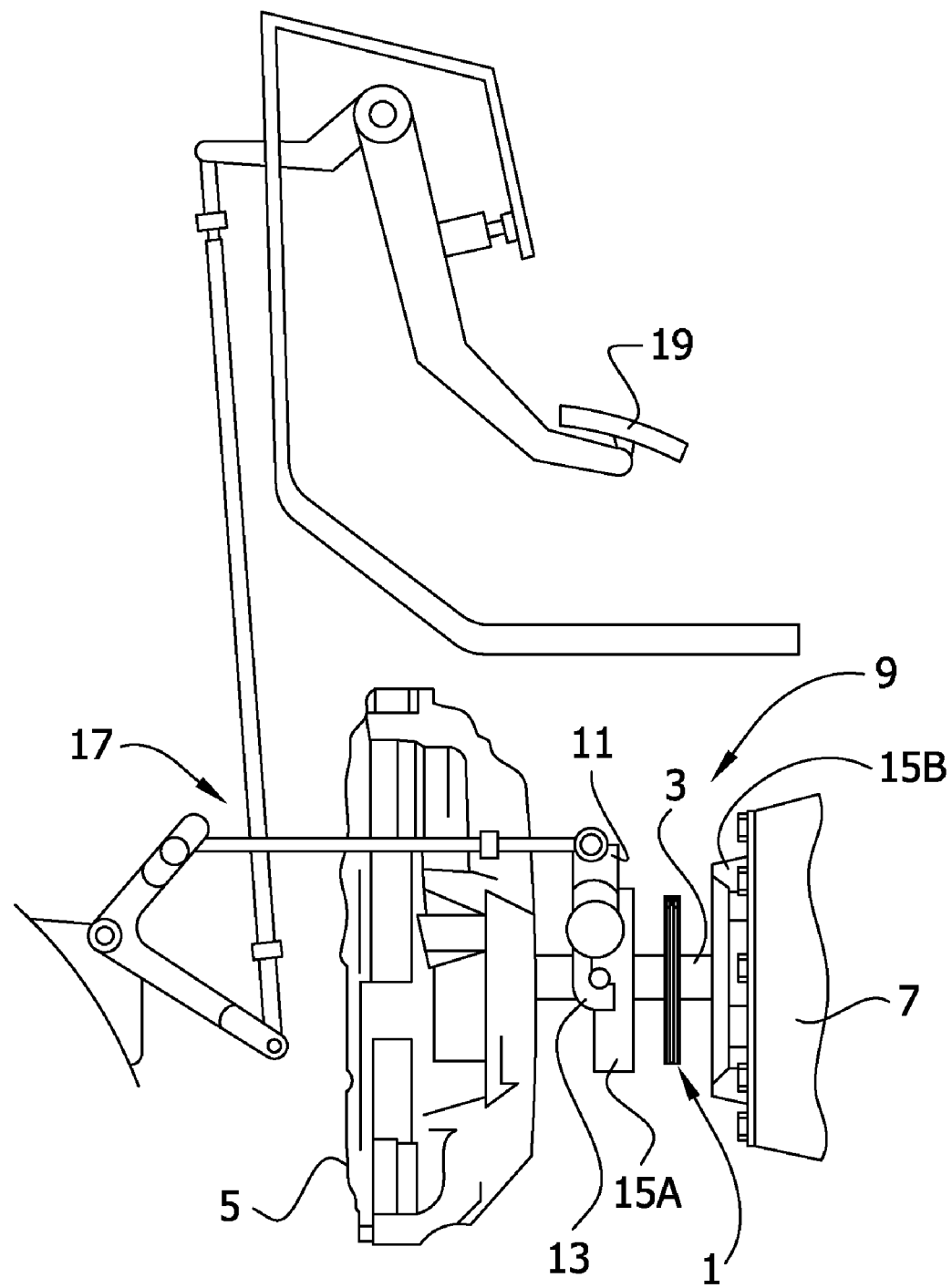
FIG. 1 is a schematic elevation of a clutch brake assembly including a clutch brake of the present invention disposed between a transmission and an engine.

Referring to FIG. 1 of the drawings, a clutch brake, generally indicated at 1, is shown as part of a clutch brake assembly used for braking rotation of a shaft 3 connecting an engine 5 to a transmission 7. The clutch brake 1 is mounted for rotation in unison with the shaft 3 and for sliding movement along the shaft. The clutch brake 1 cooperates with a braking mechanism 9 to slow rotation of the shaft 3 when the transmission is changing gears.

The braking mechanism 9 comprises a yoke 11, fingers 13 on the yoke, and a pair of clutch plates 15A, 15B mounted on the shaft. In general, each clutch plate 15A, 15B is a bearing housing cover having a friction surface at one side of the cover. The clutch brake 1 is located between the two clutch plates 15A, 15B. The yoke 11 is connected by a linkage 17 to a foot pedal 19 which is used to pivot the yoke between a free-rotation position in which the clutch brake 1 and the two clutch plates 15A, 15B are spaced from one another and the shaft 3 is freely rotatable, and a braking position in which the two clutch plates 15A, 15B are in friction engagement with opposite sides of the clutch brake to slow rotation of the shaft. A spring (not shown) biases the clutch brake 1 and clutch plate 15A toward the free-rotation position. This general operation is conventional.

Figure 2:
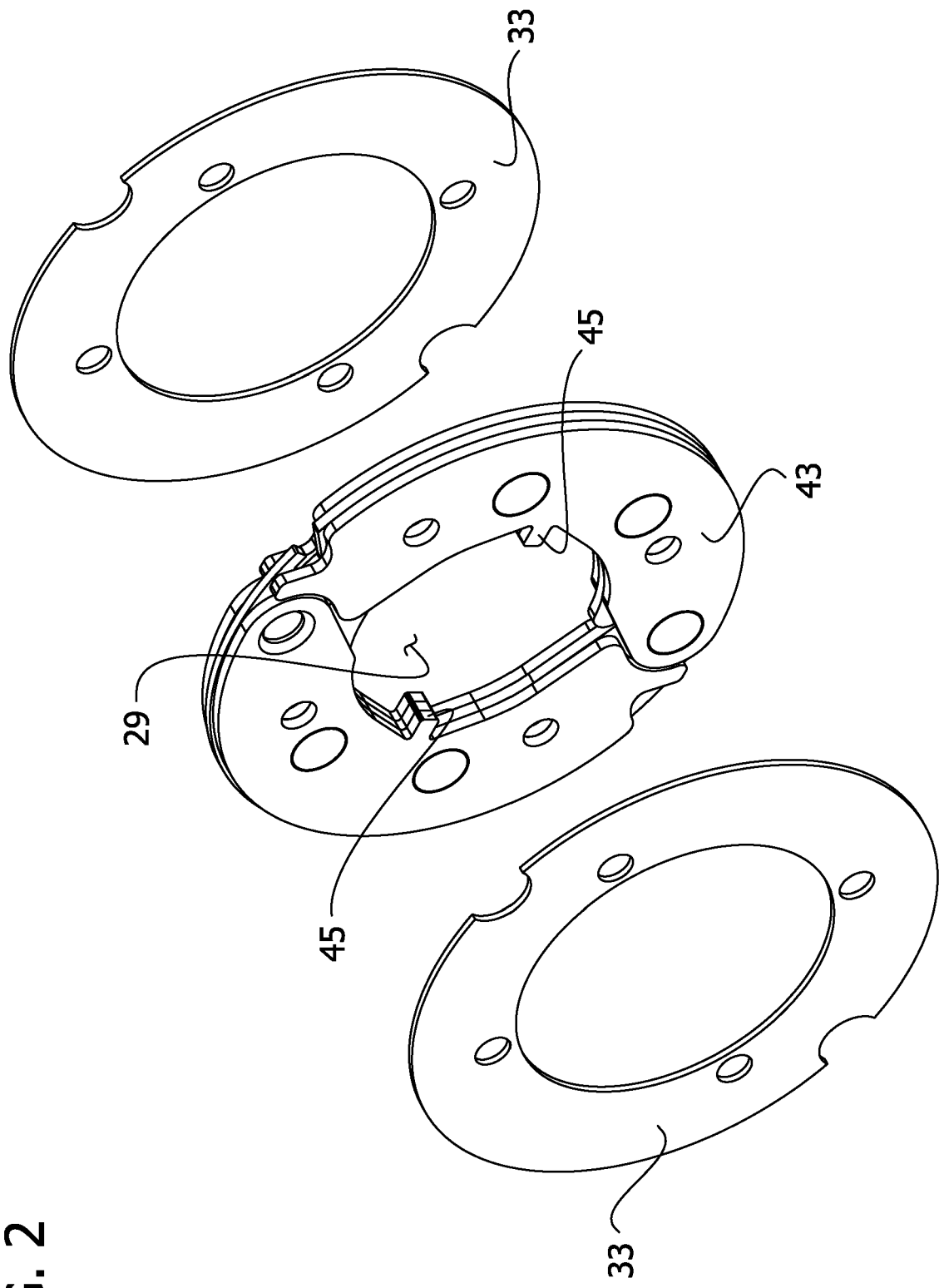
FIG. 2 is a perspective of the clutch brake with friction surfaces exploded away.
Figure 3:
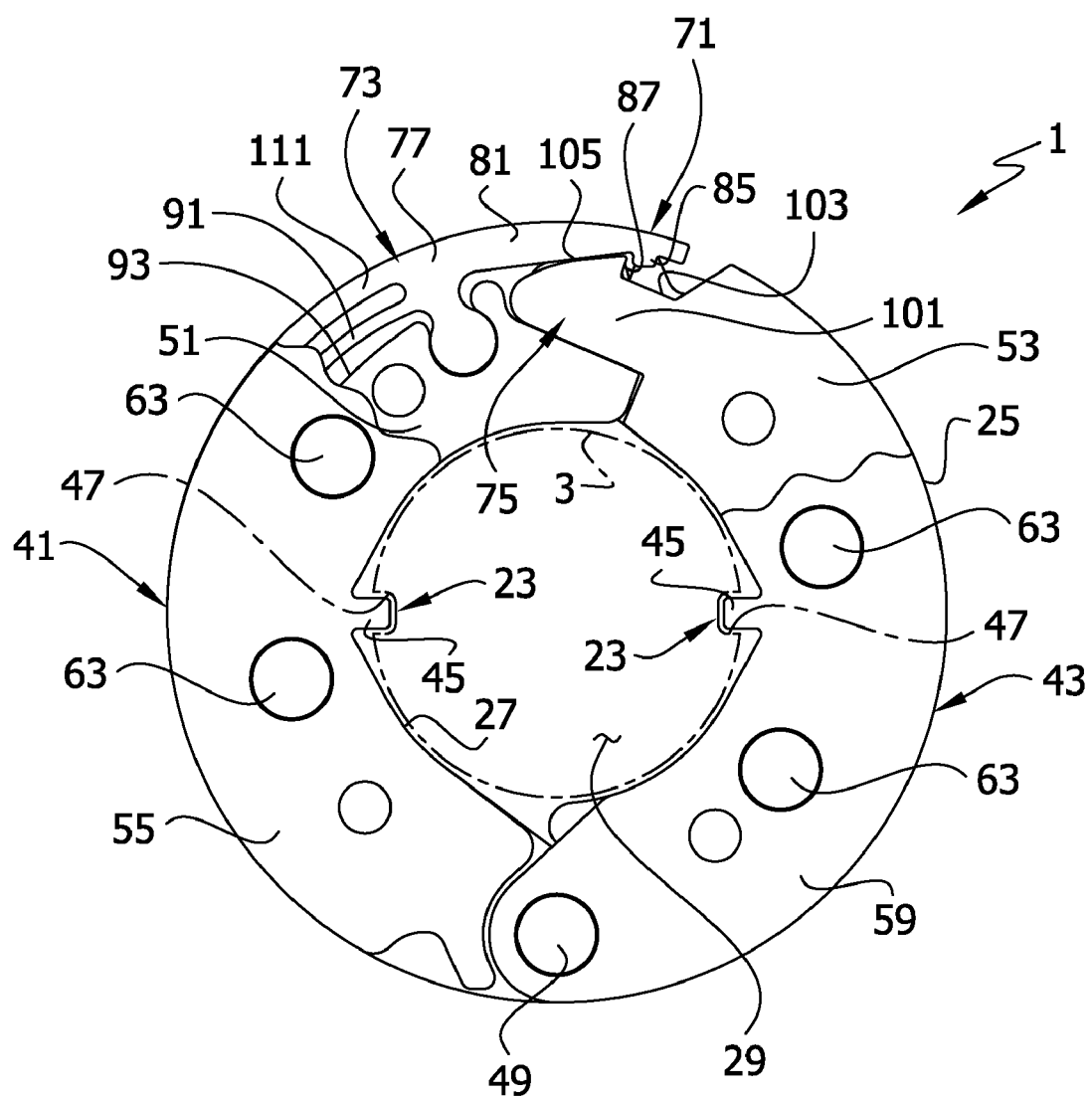
FIG. 3 is a front elevation of the clutch brake as mounted on a shaft with portions of first and second clutch brake sections broken away.

Referring now to FIGS. 2 and 3, the clutch brake 1 includes means generally indicated at 23 for connecting the clutch brake to the shaft 3 for rotation of the clutch brake in unison with the shaft. The clutch brake 1 is generally annular in shape and has an outer diameter 25 and an inner diameter 27 which defines a central opening 29 sized to receive the shaft 3. Substantially annular friction pads 33 are provided on opposite sides of the clutch brake for selective engagement with respective friction surfaces on the clutch plates 15A, 15B to brake rotation of the shaft 3.

The clutch brake 1 comprises first and second arcuate sections 41, 43 selectively movable relative to one another between disconnected and connected configurations. In the disconnected configuration (FIG. 4), the sections 41, 43 are movable generally radially relative to the shaft 3. In the connected configuration (FIG. 3), the sections 41, 43 surround the shaft 3, and the sections are locked against substantial radial motion relative to the shaft. As shown in FIG. 2, the two generally annular friction pads 33 are adhered to respective clutch brake sections 41, 43 to form an annular friction surface on each side of the clutch brake 1. The pads 33 may be made from vulcanized fiber, for example. Each pad 33 may comprise two semi-annular members without departing from the scope of the invention.

The clutch brake 1 has two key members 45 extending in a radial inward direction from the inner diameter 27 of the clutch brake 1 for locking the clutch brake against rotation relative to the shaft 3. Each key member 45 is formed generally centrally on the inner surface of each section member 41, 43 such that when the sections are interlocked, the key members extend toward one another. The key members 45 are received in two longitudinally extending slots 47 formed in the shaft 3 on opposite sides of the shaft. The key members 45 lock the clutch brake 1 against rotation relative to the shaft 3 but allow the clutch brake to slide along the shaft.

The lower ends of the two clutch brake sections 41, 43 are connected by a hinge pin 49. The hinge pin allows for pivotal movement of the two sections relative to one another between the disconnected configuration (FIG. 4) in which upper ends of the two sections are spaced apart to allow the clutch brake to be placed around the shaft, and the connected configuration (FIG. 3) in which the upper ends are connected and the clutch brake encircles the shaft.

Figure 5:
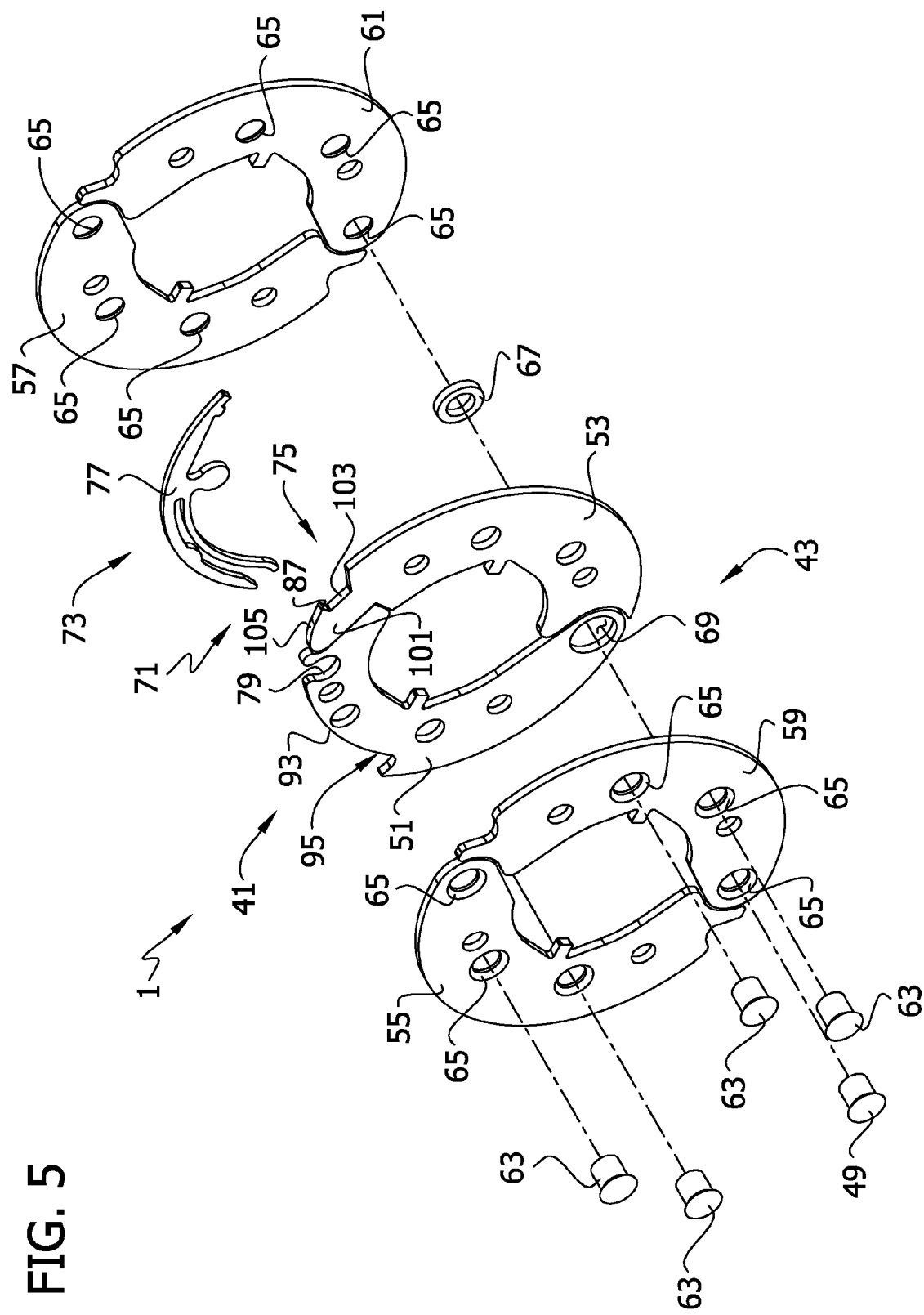
FIG. 5 is an exploded perspective of the clutch brake.

Referring to FIG. 5, each clutch brake section 41, 43 includes a lock plate 51, 53, respectively, sandwiched between first and second retaining plates 55, 57 and 59, 61, respectively. The lock plates 51, 53 and retaining plates 55, 57, 59, 61 of each section 41, 43 are affixed to one another by rivets 63 or other suitable fasteners. Alternatively, the lock plates and retaining plates can be fixed to one another by spot welding in suitable locations. The two sections 41, 43 are connected at their lower ends (as viewed in FIG. 3) by the hinge pin 49 which extends through openings 65 in the retaining plates 59, 61, of the right clutch brake section 43 and through a bushing 67 fitted in an opening 69 in the lock plate 51 of the left clutch brake section 41. Other hinge devices may be used to hinge the clutch brake sections 41, 43 to one another. For example, one of the retaining plates 59, 61 may be formed with an integral (e.g., extruded) hinge pin adapted to project through aligned openings in the lock plate 51 and the other retaining plate.

Figure 6:
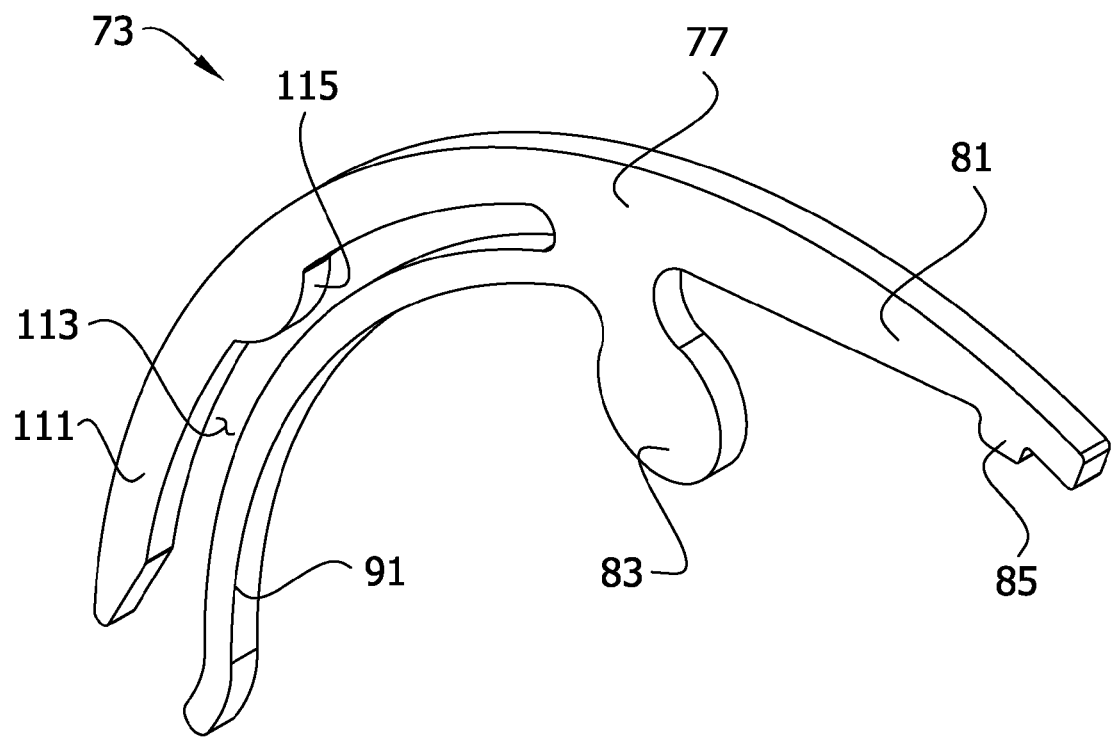
FIG. 6 is a perspective of a first fastening component of the clutch brake.

A fastening mechanism, generally indicated at 71, is provided on the first and second lock plates 51, 53 for fastening the first and second clutch brake sections 41, 43 in their connected configuration. As shown in FIGS. 5 and 6, this fastening mechanism 71 comprises a first fastening component 73 on the first lock plate 51 and a second fastening component 75 on the second lock plate 53. The first fastening component 73 comprises a fastener body 77 movably mounted in an opening 79 in the first lock plate 51, and a fastening arm 81 extending from the fastener body. The fastener body 77 is movable in the opening 79 from a fastening position (FIG. 3) in which the fastening arm 81 is in fastening engagement with the second lock plate 53 to fasten the first and second clutch brake sections 41, 43 in their connected configuration, to a release position (FIG. 4) in which the fastening arm is not in fastening engagement with the second lock plate to allow the first and second clutch brake sections to be moved to their disconnected configuration.

Referring to FIG. 6, the fastener body 77 of the first fastening component 73 comprises a circular head 83 rotatable in the opening 79 in the first lock plate 51 for movement. The fastening arm 81 extends from one side of the body 77 and has a detent 85 adjacent its outer (free) end. The detent 85 extends in a generally inward radial direction and is configured to engage a shoulder 87 on the second fastening component 75 (FIGS. 3 and 5). A spring element comprising a spring arm 91 extends from a side of the body 77 generally opposite the fastening arm 81 and is configured for resilient engagement with an edge 93 partially defining a notch 95 in the periphery of the first lock plate 51. The arrangement is such that when the head 83 of the fastener body 77 is in the opening 79 and the spring arm 91 is in contact with this edge 93, the spring arm applies a force tending to rotate the fastener body to its fastening position.

Figure 4:
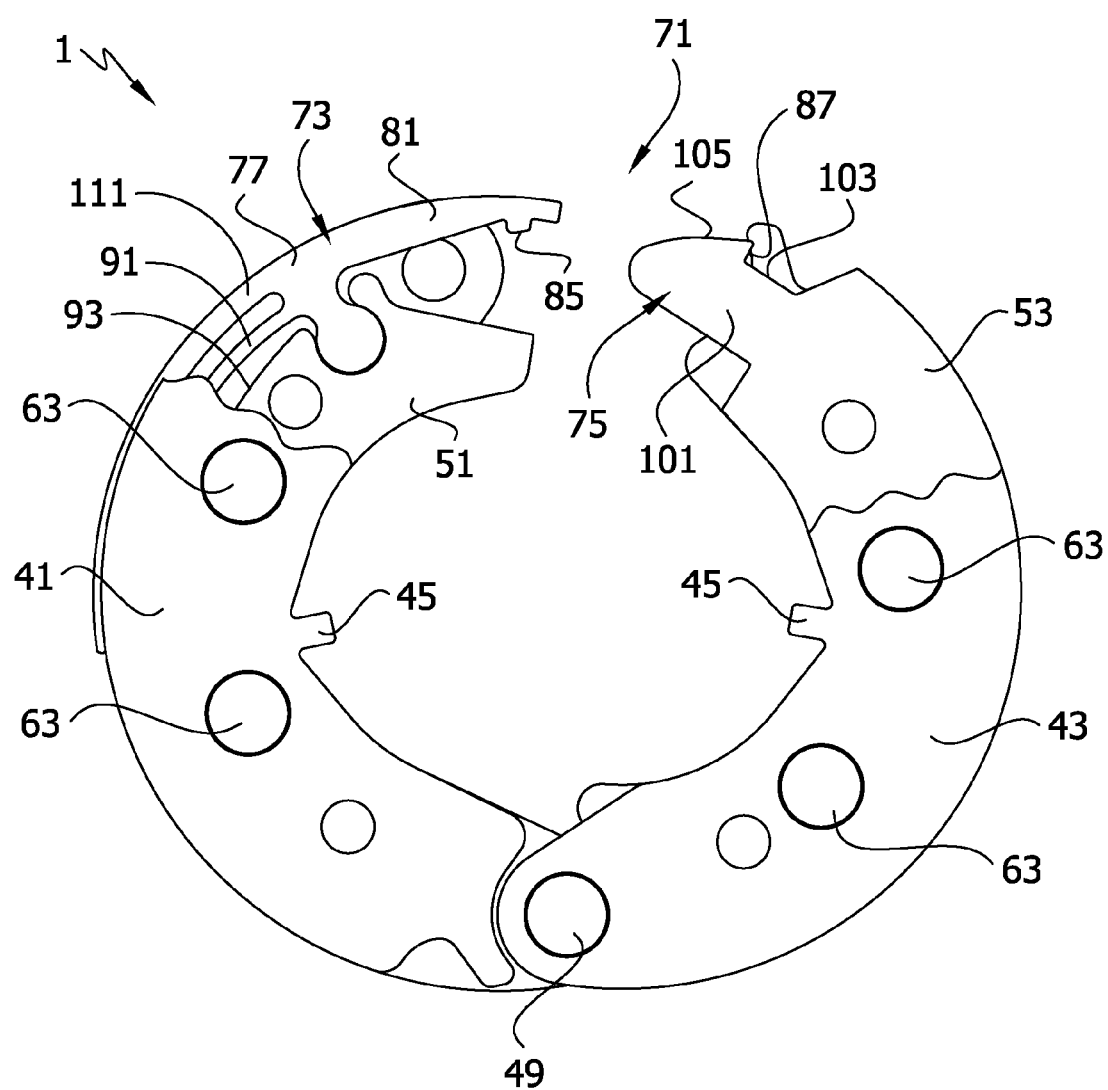
FIG. 4 is a front elevation of the clutch brake shown in a disconnected configuration with portions of the first and second clutch brake sections broken away.

The second fastening component 75 comprises an elongate tab 101 projecting from the second lock plate 53 adjacent its upper end (as viewed in FIGS. 4 and 5). The tab 101 has a notch 103 in its upper edge forming the aforementioned shoulder 87. The outer (free) end of the tab 101 is tapered to provide an inclined surface forming a ramp 105 leading to the shoulder 87. The configuration is such that the detent 85 on the fastening arm 81 is adapted to contact the ramp 105 as the two clutch brake sections 41, 43 are moved toward their connected configuration around the shaft 3. Continued movement of the two clutch brake sections 41, 43 toward their connected configuration causes the fastener arm 81 to ride up the ramp 105 and the head 83 of the fastener body 77 to rotate in the opening 79 against the urging of the spring arm 91, which deflects in an outward direction to allow the rotation. When the detent 85 on the fastener arm 81 moves beyond the ramp 105, the fastener body 77 rotates to its fastening position under the bias of the spring arm 91, and the detent on the fastening arm snaps into the notch 103 in the tab 101 for engagement of the detent with the shoulder 87 to lock the two clutch brake sections 41, 43 in their connected configuration.

To disconnect the clutch brake sections 41, 43, the fastener body 77 is rotated to its release position (FIG. 4) in which the detent 85 on the fastening arm 81 is removed from the notch 103 so that the two brake sections can be separated and removed from the shaft 3. The fastener body 77 can be rotated to its release position by using a screw driver to pry the fastening arm 81 in an upward direction, as viewed in FIG. 4, against the bias of the spring arm 91 contacting the edge 93 of the notch 95 in the first lock plate 51.

The first fastening component 73 also includes a centrifugal-assist member 111 for applying a greater fastening force to the fastening arm 81 as the shaft 3 rotates at higher speeds. The centrifugal-assist member 111 comprises a weighted arm (also designated 111) extending generally parallel to the spring arm 91 at the side of the body 77 generally opposite the fastening arm 81. The weighted arm 111 is located radially outward of the spring arm 91 and is separated from the spring arm by a gap 113 which provides space for the spring arm to deflect as the head 83 of the fastener body 77 rotates in the opening 79 in the first lock plate 51. The configuration is such that as the shaft 3 and clutch brake 1 rotate at faster speeds, the weighted arm 11 will apply a force tending to rotate the fastener body 77 toward its fastening position in which the detent 85 on the fastening arm 81 is in contact with the shoulder 87 on the tab 101 to maintain the two sections of the clutch brake 41, 43 in their connected configuration. In the illustrated embodiment, the centrifugal-assist member 111 has an enlarged detent 115 to provide a desired additional weight to the centrifugal-assist member 111. However, other weight configurations are possible. For instance the centrifugal-assist member 111 could have an enlarged outer (free) end. The detent 115 also functions as a secondary pivot point to restrict the movement of the first fastener body 77 toward the release position and ensure the spring arm 91 does not break or permanently seat on the edge 93.

Desirably, the first fastening component 73, including the fastener body 77, head 83, fastening arm 81, spring arm 91, and centrifugal-assist member 111 are integrally formed as a one-piece member. By way of example, the entire fastening component 73 may be made (e.g., laser-cut) from 0.075-in. thick plate steel and then assembled with the first lock plate 51 such that the head 83 of the fastener body 77 is received in the opening 79 and the spring arm 91 and centrifugal-assist member 111 are received in the peripheral notch 95 in the first lock plate. In the illustrated configuration, the outer edge of the first fastening component 73 along the weighted arm 111, fastener body 77 and fastening arm 81 is curved on an arc substantially identical to the outer peripheral edge of the first clutch brake section 43. As a result, when the clutch brake sections 41, 43 are connected, the outer curved edge of the first fastening component 73 is generally flush with the outer edge of the first clutch brake section 41 (see FIG. 3). Other configurations are possible within the scope of this invention.

In use, the first section 41 of the clutch brake 1 is positioned so that it engages shaft 3 with the first section extending approximately half way around the circumference of the shaft. The second section 43 is then positioned in engagement with the shaft 3 and interlocked with the first section 41 by the first and second fastening components 73, 75 so that the first and second sections form a continuous annular surface extending around the circumference of the shaft. Thus, it may be seen that the sections 41, 43 can be positioned on the shaft 3 by radial movement with respect to the shaft. The shaft 3 does not have to be disconnected from the transmission 7 or the engine 5 to install or remove the clutch brake.

In the embodiment described above, the two clutch brake sections 41, 43 are hinged together by the hinge pin 49. However, it is contemplated that the two sections 41, 43 could be connected and disconnected by using two sets of fastening components 73, 75, similar to U.S. Pat. No. 5,435,425.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A clutch brake for use in association with a braking mechanism for braking rotation of a shaft connecting an engine to a transmission, the clutch brake being generally annular in shape and comprising:
    first and second clutch brake sections;
    a friction surface on the first and second clutch brake sections adapted to face said braking mechanism and to selectively engage said braking mechanism for braking rotation of the shaft;
    the first and second clutch brake sections being selectively configurable in a disconnected configuration in which the clutch brake sections are adapted to be moved apart from one another and the clutch brake removed from the shaft with the shaft passing in a radial direction with respect to the clutch brake between the first and second clutch brake sections, and in a connected configuration in which the clutch brake encloses the shaft and the first and second clutch brake sections extend continuously along the circumference of the shaft and prevent the shaft from passing in a radial direction with respect to the clutch brake between the first and second clutch brake sections, whereby the clutch brake may be installed on and removed from the shaft without disconnecting the shaft from the transmission or the engine;
    said first section of the clutch brake comprising a first lock plate, said second section of the clutch brake comprising a second lock plate; and
    a fastening mechanism on the first and second lock plates for fastening the first and second clutch brake sections in said connected configuration;

said fastening mechanism comprising a first fastening component on said first lock plate and a second fastening component on said second lock plate;

said first fastening component comprising a fastener body movably mounted in an opening in said first lock plate, and a fastening arm extending from the fastener body;

said fastener body being movable in said opening from a fastening position in which said fastening arm is in fastening engagement with said second lock plate to fasten the first and second clutch brake sections in said connected configuration, to a release position in which said fastening arm is not in fastening engagement with said second lock plate to allow the first and second clutch brake sections to be moved to said disconnected configuration.

2. A clutch brake as set forth in claim 1 wherein said fastener body is rotatable in said opening.

3. A clutch brake as set forth in claim 1 wherein said fastener body comprises a generally circular head rotatable in said opening.

4. A clutch brake as set forth in claim 1 wherein said first fastening component further comprises a spring element urging said fastener body toward said fastening position.

5. A clutch brake as set forth in claim 4 wherein said spring element is integrally formed as one piece with the body.

6. A clutch brake as set forth in claim 4 wherein said spring element comprises a spring arm extending from a side of the body generally opposite said fastening arm.

7. A clutch brake as set forth in claim 6 wherein said first fastening component further comprises a centrifugal-assist member for applying a greater fastening force to said fastening arm as the shaft rotates at higher speeds.

8. A clutch brake as set forth in claim 7 wherein said centrifugal-assist member comprises a weighted arm extending generally parallel to said spring arm at said side of the body generally opposite said fastening arm.

9. A clutch brake as set forth in claim 8 wherein said weighted arm includes a detent thereon to provide additional weight to the weighted arm.

10. A clutch brake as set forth in claim 9 wherein said detent is adapted to engage the spring arm when the fastener body moves toward the release position.

* * * * *